United States Patent [19]

Chapman

[11] 3,999,568
[45] Dec. 28, 1976

[54] SELF UNLOADING CHECK VALVE
[76] Inventor: Walter R. Chapman, P.O. Box 8212, Erie, Pa. 16505
[22] Filed: Jan. 13, 1976
[21] Appl. No.: 648,800
[52] U.S. Cl. .............................. 137/116; 137/468; 236/102; 417/299
[51] Int. Cl.² ........................................ G05D 11/00
[58] Field of Search ............. 137/116, 468; 236/92, 236/93, 102; 417/299

[56] References Cited
UNITED STATES PATENTS
3,358,705  12/1967  Krechel .............................. 137/116

Primary Examiner—Harold W. Weakley
Attorney, Agent, or Firm—Ralph Hammar

[57] ABSTRACT

A check valve having a piston with a greater coefficient of thermal expansion than the body which closes a bleeder port at running temperatures and opens the bleeder port when flow stops or when the valve cools. A body of brass and a piston of filled TFE is a preferred combination.

13 Claims, 7 Drawing Figures

U.S. Patent  Dec. 28, 1976  3,999,568
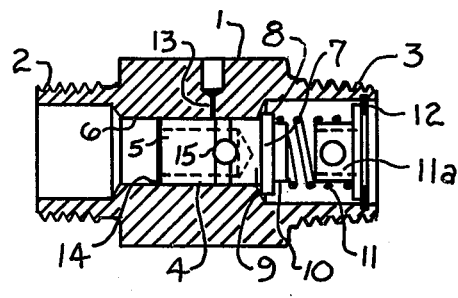
FIG. 1
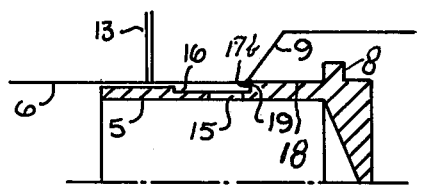
FIG. 2
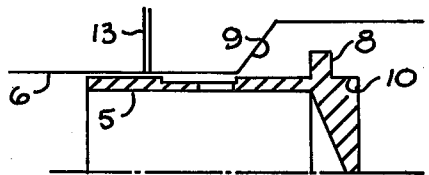
FIG. 5
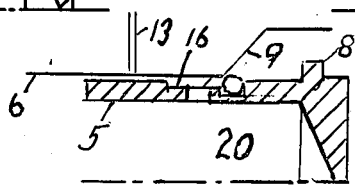
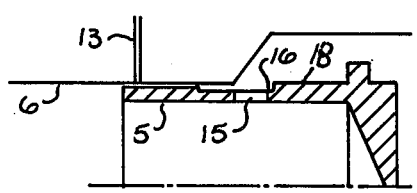
FIG. 3
FIG. 8
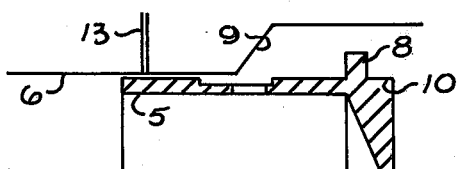
FIG. 6
FIG. 4
FIG. 7

SELF UNLOADING CHECK VALVE

This invention is a check valve for air compressors and the like which uses differential expansion of the valve piston to control the loading and unloading. The differential expansion also increases the life of the check valve.

In the drawing

FIG. 1 is a section through a valve,

FIGS. 2, 3, 4 are enlarged sections through a preferred piston in its operating positions, FIGS. 5, 6, 7 are similar sections through another piston, and FIG. 8 is an enlarged section through another piston in its midstroke position.

The valve has a one piece metal (e.g. brass) body 1 with a fitting 2 for connection to an air compressor outlet and a fitting 3 for connection to a receiver. Within the body is a plastic (e.g. filled TFE) piston 4 having a skirt 5 slidable in a bore 6 in the body and a head 7 with a valve projection 8 cooperating with a valve seat 9. On the outer end of the piston head is a seat 10 for a compression spring 11. The other end of the spring is seated on a guide member held in the body by a snap ring 12.

The valve has three positions, a fully closed position (FIGS. 1, 2 and 5) a fully open position (FIGS. 4 and 7), and an intermediate or mid position (FIGS. 3 and 6). The fully closed position is assumed when the compressor is off and also when the valve is cold. It is also assumed during the suction stroke of the compressor before the valve is warmed up by the hot compressed air. The full open position is assumed by the valve during the pressure stroke of the compressor when air is being delivered to the receiver. The intermediate position of the valve is assumed during the suction stroke of the compressor after the valve is warmed up.

In the fully closed position shown in FIG. 1 the valve member is closed against its seat 9 and air in the outlet compressor line bleeds through bleed hole 13 in the body. The air can reach the bleed hole through the clearance between the inner end 14 of the skirt and the bore 6 of the body and also through the clearance between the groove 16 and the bore 6 via a hole or port 15 in the skirt which conducts air to an external groove 16. The trailing edge 17a of the groove registers with the bleed hole in FIGS. 1 and 2. It will be noted that the clearance between the bore 6 and skirt 5 is greater at the trailing edge of the groove than at the leading edge 17b of the groove and that there is a step 18 on the skirt slightly greater in diameter than the balance of the skirt. The height of the step varies with the size of the valve. For a small valve the step would be 0.002 inch to 0.004 inch. For larger valves the step would be higher. When a piston is cold, as would be the case when the compressor was shut down, the step has a sliding fit in the bore 6. However, due to the greater coefficient of thermal expansion of the piston, when the piston is hot, the diameter of the step 18 is greater than the diameter of the bore 6 and the piston is positively stopped at the mid position of FIG. 3 during the suction stroke of the compressor. The corner 19 of the step provides a seal against the valve seat at the mid position. In the mid position and also in the fully open position of the piston, the smaller diameter section of the piston, the smaller diameter section of the piston skirt blocks the bleed hole 13 so the leakage through the bleed hole is minimal. When the compressor shuts down, the differential pressure across the valve increases as air leaks through the bleed hole 13 and the increased difference between the receiver and compressor discharge line pressure forces the piston to the fully closed position and the air in the compressor discharge line upstream of the valve seat 9 is bled to atmosphere through the bleed hole 13.

The main difference in the structure of FIGS. 5, 6 and 7 are the omission of step 18 so the entire piston skirt has the same diameter throughout its length. The skirt diameter is chosen so that the piston skirt when hot exerts a light friction force against the bore 6 so the piston is either held open or is restricted to movement between the fully open position of FIG. 7 and the mid position of FIG. 6. The mid position of FIG. 6 is not sharply defined as with the piston having the step 18 because the restriction of the piston movement depends upon the friction between the piston skirt and the bore 6 rather than upon movement of the step against a positive stop.

In the operation, from a cold start the piston initially moves full stroke in the bore 6, from full open to full closed and during this mode small puffs of air come out of the bleed hole 13. After the compressor has pumped for a short period of time the piston expands due to the heating of the piston by the hot compressed air and the piston stroke is shortened so that air bleed from the bleed port 13 is minimized. In this mode the piston is moving between the full and intermediate stroke positions of FIGS. 2, 3 and 6, 7. When the compressor is shut down or on idle, the piston holds partially open for up to a few seconds and then fully closes to bleed air from the discharge line upstream of the valve seat 9. When the compressor is restarted after the bleeding, the pressure in the compressor discharge line is atmospheric pressure and the compressor accordingly is "unloaded" because it does not start against receiver pressure.

The skirt 5 should have thin walls so as to heat up and cool down quickly. Good results have been obtained in a ⅜ inch diameter skirt with a wall thickness of 20/1000 inch.

The piston 4 functions as a valve member and 5 the skirt of the piston functions as a valve stem.

For valves which do not need the unloading feature, the bleed hole 13 may be omitted. The operation is similar. When the valve warms up, the piston stroke is shortened and the valve may in some cases remain fully open while the compressor is pumping. This eliminates the pounding of the check valve against its seat and increases the life of the check valve.

The operation of the valve does not depend entirely upon cooling to cause closing of the valve when the compressor shuts down. When the stem is hot the diameter is too large to be received quickly in the bore under the small pressure differentials which exist when the compressor is running. The valve stem accordingly operates between the mid and closed positions of FIGS. 3, 4 and 6, 7. However when the compressor shuts down, the flow of air from the compressor stops and even a slight leakage through the bleed hole 13 reduces the pressure on the upstream side of the valve while full tank pressure remains on the downstream side of the valve. The increased pressure differential forces the valve to the closed position before the valve has fully cooled.

It is not necessary that the valve and the body have different coefficients of thermal expansion. It is only necessary that the valve be stopped in the intermediate position during the suction stroke of the compressor when the compressor is running. FIG. 8 shows a structure for accomplishing this result by substituting for step 18 a compliant seal such as O ring 20. When the compressor is running, the differential pressure across the valve is very small, only enough to open the valve against the force of spring 11 and overcome flow losses. Under this slight pressure the friction between the O ring and the bore is sufficient to stop the O ring at the mouth of the bore as shown in FIG. 8 where the O ring seals against the mouth of the bore and the vent opening 13 is blocked by the stem 14 and there is substantially no leakage through the vent opening. When the compressor stops, the full receiver pressure acts on the downstream side of the valve and the pressure on the upstream side of the valve is reduced by leakage through the bleed opening 13. This results in a large differential pressure across the valve which causes the O ring to be forced fully into the bore in the fully closed position and brings the piston groove under the bleed hole to unload the system. In this arrangement the O ring may serve also as the main check valve seal with the projection 8 acting as the piston stop.

The combination of a metal body with a TFE piston keeps the vent 13 clean and prevents blocking with carbon particles.

Since there is only a single bleed opening 13, whenever the skirt 5 covers or blocks the opening as in FIGS. 3–8, any flow through the opening causes a pressure differential which forces the skirt sidewise toward the opening to improve the blocking or sealing action.

I claim:

1. A check valve comprising a body having an inlet for connection to an air compressor discharge line, an outlet for connection to a receiver, a valve seat between the inlet and outlet, a bore leading from the inlet to the valve seat, and a bleed opening from said bore upstream of the valve seat, a valve member having a head downstream of the valve seat movable away from the seat to allow flow through the outlet to the receiver and against the seat to check backflow from the receiver and a valve stem in said bore having a coefficient of thermal expansion greater than the bore, the differential thermal expansion of the valve stem and bore causing the stem to block the bleed opening when hot compressed air is flowing through the valve and to unblock the bleed opening when flow through the valve stops thereby allowing the bleeding of air upstream of the valve when the compressor is off.

2. The valve of claim 1 in which the stem is tubular and air from the inlet flows through the stem to the valve seat.

3. The valve of claim 2 in which the stem has a port leading to the valve seat downstream of the bleed opening.

4. The valve of claim 1 in which the differential expansion introduces friction between the stem and the bore causing shortening of the stroke of the valve when hot compressed air is being delivered to the valve.

5. The valve of claim 1 in which the stem unblocks the bleed opening when the head is fully closed against the valve seat.

6. The valve of claim 5 in which the stem has a step received in the bore when cold and too large to be received in the bore when hot under the differential pressures across the valve when the compressor is running and received in the bore under the differential pressures across the valve when the compressor is shut down so closure of the head against the seat is prevented when the stem is hot.

7. The valve of claim 6 in which the step when hot seals against the valve seat when preventing closure of the head against the seat.

8. The valve of claim 5 in which the stem has a step received in the bore when cold and too large to be received quickly or at small closing pressure differentials so closure of the head against the seat is momentarily delayed when the stem is hot and the valve operates between mid stroke and full open positions when the compressor is running and fully closes after the compressor is stopped.

9. The valve of claim 5 in which the stem blocks the bleed opening in a mid position between the fully open and fully closed positions and the valve stem when hot prevents movement to the fully closed position when the compressor is running so the valve operates between mid position and fully open position when the compressor is running and fully closes after the compressor is stopped.

10. A check valve comprising a body having an inlet for connection to an air compressor discharge line, an outlet for connection to a receiver, a bore having an inlet end receiving air from said inlet and an outlet end for discharge to said outlet and a bleed opening from said bore between the inlet and outlet ends of the bore, a valve member movable away from the outlet end of the bore to a fully open position to allow flow through the outlet to the receiver and to a fully closed position to check backflow from the receiver and to an intermediate position between the fully open and fully closed positions, said valve member having a stem in said bore unblocking the bleed opening in the fully closed position and blocking the bleed opening in the intermediate and fully open positions, and means for preventing movement from the fully open position past said intermediate position under the low differential pressures existing when the compressor is running but not under the high differential pressures existing when the compressor is off.

11. The check valve of claim 10 in which the means is further defined as a compliant seal too large to be received in the bore under said low differential pressure but received in the bore under said high differential pressure.

12. The check valve of claim 11 in which the compliant seal seals the outlet end of the bore in said intermediate and fully closed positions.

13. The check valve of claim 10 in which the body is metal and the valve stem is TFE.

* * * * *